(12) United States Patent
Sule

(10) Patent No.: US 11,188,391 B1
(45) Date of Patent: Nov. 30, 2021

(54) ALLOCATING RESOURCES TO ON-DEMAND CODE EXECUTIONS UNDER SCARCITY CONDITIONS

(71) Applicant: Amazon Technologies, Inc., Seattle, WA (US)

(72) Inventor: Balint Sule, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 16/816,059

(22) Filed: Mar. 11, 2020

(51) Int. Cl.
    *G06F 9/46*     (2006.01)
    *G06F 9/50*     (2006.01)

(52) U.S. Cl.
    CPC .................. *G06F 9/5055* (2013.01)

(58) Field of Classification Search
    CPC ..................................................... G06F 9/5055
    See application file for complete search history.

(56) References Cited

U.S. PATENT DOCUMENTS

| | | | |
|---|---|---|---|
| 4,949,254 A | 8/1990 | Shorter | |
| 5,283,888 A | 2/1994 | Dao et al. | |
| 5,970,488 A | 10/1999 | Crowe et al. | |
| 6,260,058 B1 | 7/2001 | Hoenninger et al. | |
| 6,385,636 B1 | 5/2002 | Suzuki | |
| 6,463,509 B1 | 10/2002 | Teoman et al. | |
| 6,501,736 B1 | 12/2002 | Smolik et al. | |
| 6,523,035 B1 | 2/2003 | Fleming et al. | |
| 6,549,936 B1 | 4/2003 | Hirabayashi | |
| 6,708,276 B1 | 3/2004 | Yarsa et al. | |
| 7,036,121 B1 | 4/2006 | Casabona et al. | |
| 7,590,806 B2 | 9/2009 | Harris et al. | |

(Continued)

FOREIGN PATENT DOCUMENTS

| | | |
|---|---|---|
| EP | 2663052 A1 | 11/2013 |
| JP | 2002287974 A | 10/2002 |

(Continued)

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

(Continued)

*Primary Examiner* — Gregory A Kessler
(74) *Attorney, Agent, or Firm* — Knobbe, Martens, Olson & Bear, LLP

(57) ABSTRACT

Systems and methods are described for allocating resources on an on-demand code execution system under conditions of scarcity, when demand for resources exceeds threshold limits. Under such conditions, a single high-demand resource consumer—such as a function or an account on the system—might monopolize available resources, denying access to the system to other resource consumers. Embodiments of the present disclosure prevent that monopolization by implementing constrained equal awards allocation, whereby resource consumers with relatively low-demand are allocated their requested resources, and remaining resources are divided substantially equally among remaining consumers of relatively high demand. The allocation techniques described herein may be implemented even under varying demand levels, without requiring each consumer to positively state their desired portion prior to allocation.

21 Claims, 5 Drawing Sheets

(56) References Cited

U.S. PATENT DOCUMENTS

| | | |
|---|---|---|
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 | 11/2010 | Nichols et al. |
| 7,870,153 B2 | 1/2011 | Croft et al. |
| 7,886,021 B2 | 2/2011 | Scheitler et al. |
| 7,949,677 B2 | 5/2011 | Croft et al. |
| 7,954,150 B2 | 5/2011 | Croft et al. |
| 8,010,679 B2 | 8/2011 | Low et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,201,026 B1 | 6/2012 | Bornstein et al. |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,429,282 B1 | 4/2013 | Ahuja |
| 8,448,165 B1 | 5/2013 | Conover |
| 8,490,088 B2 | 7/2013 | Tang |
| 8,555,281 B1 | 10/2013 | Dijk et al. |
| 8,560,699 B1 | 10/2013 | Theimer et al. |
| 8,566,835 B2 | 10/2013 | Wang et al. |
| 8,601,323 B2 | 12/2013 | Tsantilis |
| 8,613,070 B1 | 12/2013 | Borzycki et al. |
| 8,615,589 B1 | 12/2013 | Adogla et al. |
| 8,631,130 B2 | 1/2014 | Jackson |
| 8,667,471 B2 | 3/2014 | Wintergerst et al. |
| 8,677,359 B1 | 3/2014 | Cavage et al. |
| 8,694,996 B2 | 4/2014 | Cawlfield et al. |
| 8,700,768 B2 | 4/2014 | Benari |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,863 B2 | 9/2014 | Hansson et al. |
| 8,825,964 B2 | 9/2014 | Sopka et al. |
| 8,839,035 B1 | 9/2014 | Dimitrovich et al. |
| 8,850,432 B2 | 9/2014 | Mcgrath et al. |
| 8,869,300 B2 | 10/2014 | Singh et al. |
| 8,874,952 B2 | 10/2014 | Tameshige et al. |
| 8,904,008 B2 | 12/2014 | Calder et al. |
| 8,966,495 B2 | 2/2015 | Kulkarni |
| 8,997,093 B2 | 3/2015 | Dimitrov |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,086,924 B2 | 7/2015 | Barsness et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,672 B2 | 12/2018 | Wagner et al. |
| 10,162,688 B2 | 12/2018 | Wagner |
| 10,203,990 B2 | 2/2019 | Wagner et al. |
| 10,248,467 B2 | 4/2019 | Wisniewski et al. |
| 10,277,708 B2 | 4/2019 | Wagner et al. |
| 10,303,492 B1 | 5/2019 | Wagner et al. |

(56) References Cited

U.S. PATENT DOCUMENTS

| | | |
|---|---|---|
| 10,353,678 B1 | 7/2019 | Wagner |
| 10,353,746 B2 | 7/2019 | Reque et al. |
| 10,365,985 B2 | 7/2019 | Wagner |
| 10,387,177 B2 | 8/2019 | Wagner et al. |
| 10,402,231 B2 | 9/2019 | Marriner et al. |
| 10,437,629 B2 | 10/2019 | Wagner et al. |
| 10,445,140 B1 | 10/2019 | Sagar et al. |
| 10,503,626 B2 | 12/2019 | Idicula et al. |
| 10,528,390 B2 | 1/2020 | Brooker et al. |
| 10,552,193 B2 | 2/2020 | Wagner et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,623,476 B2 | 4/2020 | Thompson |
| 10,649,749 B1 | 5/2020 | Brooker et al. |
| 10,691,498 B2 | 6/2020 | Wagner |
| 10,713,080 B1 | 7/2020 | Brooker et al. |
| 10,725,752 B1 | 7/2020 | Wagner et al. |
| 10,725,826 B1 | 7/2020 | Sagar et al. |
| 10,733,085 B1 | 8/2020 | Wagner |
| 10,754,701 B1 | 8/2020 | Wagner |
| 10,776,171 B2 | 9/2020 | Wagner et al. |
| 2001/0044817 A1 | 11/2001 | Asano et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0191795 A1 | 10/2003 | Bernardin et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0094396 A1 | 4/2007 | Takano et al. |
| 2007/0101325 A1 | 5/2007 | Bystricky et al. |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Husain |
| 2008/0209423 A1 | 8/2008 | Hirai |
| 2008/0244547 A1 | 10/2008 | Wintergerst et al. |
| 2009/0006897 A1 | 1/2009 | Sarsfield |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2011/0010690 A1 | 1/2011 | Howard et al. |
| 2011/0010722 A1 | 1/2011 | Matsuyama |
| 2011/0029970 A1 | 2/2011 | Arasaratnam |
| 2011/0029984 A1 | 2/2011 | Norman et al. |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |

(56) References Cited

U.S. PATENT DOCUMENTS

| | | |
|---|---|---|
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265067 A1 | 10/2011 | Schulte et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0144290 A1 | 6/2012 | Goldman et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0204164 A1 | 8/2012 | Castanos et al. |
| 2012/0222038 A1 | 8/2012 | Katragadda et al. |
| 2012/0233464 A1 | 9/2012 | Miller et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0151587 A1 | 6/2013 | Takeshima et al. |
| 2013/0151648 A1 | 6/2013 | Luna |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |

(56) References Cited

U.S. PATENT DOCUMENTS

| | | |
|---|---|---|
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0344457 A1 | 11/2014 | Bruno, Jr. et al. |
| 2014/0344736 A1 | 11/2014 | Ryman et al. |
| 2014/0359093 A1 | 12/2014 | Raju et al. |
| 2014/0372533 A1 | 12/2014 | Fu et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143381 A1 | 5/2015 | Chin et al. |
| 2015/0154046 A1 | 6/2015 | Farkas et al. |
| 2015/0163231 A1 | 6/2015 | Sobko et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0324174 A1 | 11/2015 | Bromley et al. |
| 2015/0324182 A1 | 11/2015 | Barros et al. |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0370560 A1 | 12/2015 | Tan et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0077901 A1 | 3/2016 | Roth et al. |
| 2016/0092324 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0117163 A1 | 4/2016 | Fukui et al. |
| 2016/0117254 A1 | 4/2016 | Susarla et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0191420 A1 | 6/2016 | Nagarajan et al. |
| 2016/0203219 A1 | 7/2016 | Hoch et al. |
| 2016/0212007 A1 | 7/2016 | Alatorre et al. |
| 2016/0226955 A1 | 8/2016 | Moorthi et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0350099 A1 | 12/2016 | Suparna et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378547 A1 | 12/2016 | Brouwer et al. |
| 2016/0378554 A1 | 12/2016 | Gummaraju et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085591 A1 | 3/2017 | Ganda et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0272462 A1 | 9/2017 | Kraemer et al. |
| 2017/0286143 A1 | 10/2017 | Wagner et al. |
| 2017/0286187 A1 | 10/2017 | Chen et al. |
| 2017/0329578 A1 | 11/2017 | Iscen |
| 2017/0346808 A1 | 11/2017 | Anzai et al. |
| 2017/0364345 A1 | 12/2017 | Fontoura et al. |
| 2017/0371720 A1 | 12/2017 | Basu et al. |
| 2017/0371724 A1 | 12/2017 | Wagner et al. |
| 2017/0372142 A1 | 12/2017 | Bilobrov |
| 2018/0004555 A1 | 1/2018 | Ramanathan et al. |
| 2018/0046453 A1 | 2/2018 | Nair et al. |
| 2018/0046482 A1 | 2/2018 | Karve et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0081717 A1 | 3/2018 | Li |
| 2018/0095738 A1 | 4/2018 | Dürkop et al. |
| 2018/0121245 A1 | 5/2018 | Wagner et al. |
| 2018/0143865 A1 | 5/2018 | Wagner et al. |
| 2018/0150339 A1 | 5/2018 | Pan et al. |
| 2018/0192101 A1 | 7/2018 | Bilobrov |
| 2018/0239636 A1 | 8/2018 | Arora et al. |
| 2018/0253333 A1 | 9/2018 | Gupta |
| 2018/0275987 A1 | 9/2018 | Vandeputte |
| 2018/0285101 A1 | 10/2018 | Yahav et al. |
| 2018/0309819 A1 | 10/2018 | Thompson |
| 2018/0341504 A1 | 11/2018 | Kissell |
| 2019/0072529 A1 | 3/2019 | Andrawes et al. |
| 2019/0102231 A1 | 4/2019 | Wagner |
| 2019/0108058 A1 | 4/2019 | Wagner et al. |
| 2019/0140831 A1 | 5/2019 | De Lima Junior et al. |
| 2019/0155629 A1 | 5/2019 | Wagner et al. |
| 2019/0171470 A1 | 6/2019 | Wagner |
| 2019/0179725 A1 | 6/2019 | Mital et al. |
| 2019/0180036 A1 | 6/2019 | Shukla |
| 2019/0196884 A1 | 6/2019 | Wagner |
| 2019/0227849 A1 | 7/2019 | Wisniewski et al. |

(56) References Cited

U.S. PATENT DOCUMENTS

| | | | |
|---|---|---|---|
| 2019/0235848 | A1 | 8/2019 | Swiecki et al. |
| 2019/0250937 | A1 | 8/2019 | Thomas et al. |
| 2019/0286475 | A1 | 9/2019 | Mani |
| 2019/0303117 | A1 | 10/2019 | Kocberber et al. |
| 2019/0361802 | A1 | 11/2019 | Li et al. |
| 2019/0384647 | A1 | 12/2019 | Reque et al. |
| 2019/0391834 | A1 | 12/2019 | Mullen et al. |
| 2020/0026527 | A1 | 1/2020 | Xu et al. |
| 2020/0057680 | A1 | 2/2020 | Marriner et al. |
| 2020/0073770 | A1 | 3/2020 | Mortimore, Jr. et al. |
| 2020/0104198 | A1 | 4/2020 | Hussels et al. |
| 2020/0104378 | A1 | 4/2020 | Wagner et al. |
| 2020/0110691 | A1 | 4/2020 | Bryant et al. |
| 2020/0142724 | A1 | 5/2020 | Wagner et al. |
| 2020/0192707 | A1 | 6/2020 | Brooker et al. |

FOREIGN PATENT DOCUMENTS

| | | | |
|---|---|---|---|
| JP | 2006-107599 | A | 4/2006 |
| JP | 2007-538323 | A | 12/2007 |
| JP | 2010-026562 | A | 2/2010 |
| JP | 2011-233146 | A | 11/2011 |
| JP | 2011257847 | A | 12/2011 |
| JP | 2013-156996 | A | 8/2013 |
| JP | 2014-525624 | A | 9/2014 |
| JP | 2017-534107 | A | 11/2017 |
| JP | 2017-534967 | A | 11/2017 |
| JP | 2018-503896 | A | 2/2018 |
| JP | 2018-512087 | A | 5/2018 |
| JP | 2018-536213 | A | 12/2018 |
| WO | WO 2008/114454 | A1 | 9/2008 |
| WO | WO 2009/137567 | A1 | 11/2009 |
| WO | WO 2012/039834 | A1 | 3/2012 |
| WO | WO 2012/050772 | A1 | 4/2012 |
| WO | WO 2013/106257 | A1 | 7/2013 |
| WO | WO 2015/078394 | A1 | 6/2015 |
| WO | WO 2015/108539 | A1 | 7/2015 |
| WO | WO 2016/053950 | A1 | 4/2016 |
| WO | WO 2016/053968 | A1 | 4/2016 |
| WO | WO 2016/053973 | A1 | 4/2016 |
| WO | WO 2016/090292 | A1 | 6/2016 |
| WO | WO 2016/126731 | A1 | 8/2016 |
| WO | WO 2016/164633 | A1 | 10/2016 |
| WO | WO 2016/164638 | A1 | 10/2016 |
| WO | WO 2017/059248 | A1 | 4/2017 |
| WO | WO 2017/112526 | A1 | 6/2017 |
| WO | WO 2017/172440 | A1 | 10/2017 |
| WO | WO 2018/005829 | A1 | 1/2018 |
| WO | WO 2018/098445 | A1 | 5/2018 |
| WO | WO 2020/005764 | A1 | 1/2020 |
| WO | WO 2020/069104 | A1 | 4/2020 |

OTHER PUBLICATIONS

Adapter Pattern, Wikipedia, https://en.Wikipedia.org/w/index.php?title=Adapter_pattern&oldid=654971255, [retrieved May 26, 2016], 6 pages.
Amazon, "AWS Lambda: Developer Guide", Retrieved from the Internet, Jun. 26, 2016, URL : http://docs.aws.amazon.com/lambda/latest/dg/lambda-dg.pdf, 346 pages.
Amazon, "AWS Lambda: Developer Guide", Retrieved from the Internet, 2019, URL : http://docs.aws.amazon.com/lambda/ latest/dg/lambda-dg.pdf, 521 pages.
Balazinska et al., Moirae: History-Enhanced Monitoring, Published: 2007, 12 pages.
Ben-Yehuda et al., "Deconstructing Amazon EC2 Spot Instance Pricing", ACM Transactions on Economics and Computation 1.3, 2013, 15 pages.
Bhadani et al., Performance evaluation of web servers using central load balancing policy over virtual machines on cloud, Jan. 2010, 4 pages.
CodeChef ADMIN discussion web page, retrieved from https://discuss.codechef.com/t/what-are-the-memory-limit-and-stack-size-on-codechef/14159, 2019.
CodeChef IDE web page, Code, Compile & Run, retrieved from https://www.codechef.com/ide, 2019.
Czajkowski, G., and L. Daynes, Multitasking Without Compromise: A Virtual Machine Evolution 47(4a):60-73, ACM SIGPLAN Notices—Supplemental Issue, Apr. 2012.
Das et al., Adaptive Stream Processing using Dynamic Batch Sizing, 2014, 13 pages.
Deis, Container, 2014, 1 page.
Dombrowski, M., et al., Dynamic Monitor Allocation in the Java Virtual Machine, JTRES '13, Oct. 9-11, 2013, pp. 30-37.
Dynamic HTML, Wikipedia page from date Mar. 27, 2015, retrieved using the WayBackMachine, from https://web.archive.Org/web/20150327215418/https://en.wikipedia.org/wiki/Dynamic_HTML, 2015, 6 pages.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Han et al., Lightweight Resource Scaling for Cloud Applications, 2012, 8 pages.
Hoffman, Auto scaling your website with Amazon Web Services (AWS)—Part 2, Cardinalpath, Sep. 2015, 15 pages.
http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR,va123, 2014.
http://www.codechef.com/ide web page from date Apr. 5, 2015, retrieved using the WayBackMachine, from https://web.archive.Org/web/20150405045518/http://www.codechef.com/ide, 2015.
Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, dated Apr. 3, 2006 with Machine Translation.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.
Krsul et al., "VMPlants: Providing and Managing Virtual Machine Execution Environments for Grid Computing", SUPERCOMPUTING, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Sakamoto, et al. "Platform for Web Services using Proxy Server"; Research Report from Information Processing Society, Mar. 22, 2002, vol. 2002, No. 31.
Shim (computing), Wikipedia, https://en.Wikipedia.org/w/index.php?title+Shim_(computing)&oldid+654971528, [retrieved on May 26, 2016], 2 pages.
Stack Overflow, Creating a database connection pool, 2009, 4 pages.
Tan et al., Provisioning for large scale cloud computing services, Jun. 2012, 2 pages.

(56) References Cited

OTHER PUBLICATIONS

Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en.wikipedia.org/wiki/Application_programming_interface.
Wikipedia List_of_HTTP status_codes web page, retrieved from https://en.wikipedia.org/wiki/List_of_HTTP status_codes, 2019.
Wikipedia Recursion web page from date Mar. 26, 2015, retrieved using the WayBackMachine, from https://web.archive.org/web/20150326230100/https://en.wikipedia.org/wiki/Recursion_(computer_science), 2015.
Wikipedia subroutine web page, retrieved from https://en.wikipedia.org/wiki/Subroutine, 2019.
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yue et al., AC 2012-4107: Using Amazon EC2 in Computer and Network Security Lab Exercises: Design, Results, and Analysis, 2012, American Society for Engineering Education 2012.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
International Search Report and Written Opinion in PCT/US2015/064071 dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Preliminary Report on Patentability in PCT/US/2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
Ha et al., A Concurrent Trace-based Just-In-Time Compiler for Single-threaded JavaScript, utexas.edu (Year: 2009).
Huang, Zhe, Danny HK Tsang, and James She. "A virtual machine consolidation framework for mapreduce enabled computing clouds." 2012 24th International Teletraffic Congress (ITC 24). IEEE, 2012. (Year: 2012).
Lagar-Cavilla, H. Andres, et al. "Snowflock: Virtual machine cloning as a first-class cloud primitive." ACM Transactions on Computer Systems (TOCS) 29.1 (2011): 1-45. (Year: 2011).
Tange, "GNU Parallel: The Command-Line Power Tool", vol. 36, No. 1, Jan. 1, 1942, pp. 42-47.
Wood, Timothy, et al. "Cloud Net: dynamic pooling of cloud resources by live WAN migration of virtual machines." ACM Sigplan Notices 46.7 (2011): 121-132. (Year: 2011).
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Extended Search Report in European Application No. 19199402.9 dated Mar. 6, 2020.
Office Action in Canadian Application No. 2,962,633 dated May 21, 2020.
Office Action in Canadian Application No. 2,962,631 dated May 19, 2020.
Office Action in European Application No. 16781265.0 dated Jul. 13, 2020.
International Search Report and Written Opinion dated Oct. 15, 2019 for International Application No. PCT/US2019/039246 in 16 pages.
International Search Report for Application No. PCT/US2019/038520 dated Aug. 14, 2019.
International Search Report for Application No. PCT/US2020/039996 dated Oct. 8, 2020.

ALLOCATING RESOURCES TO ON-DEMAND CODE EXECUTIONS UNDER SCARCITY CONDITIONS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
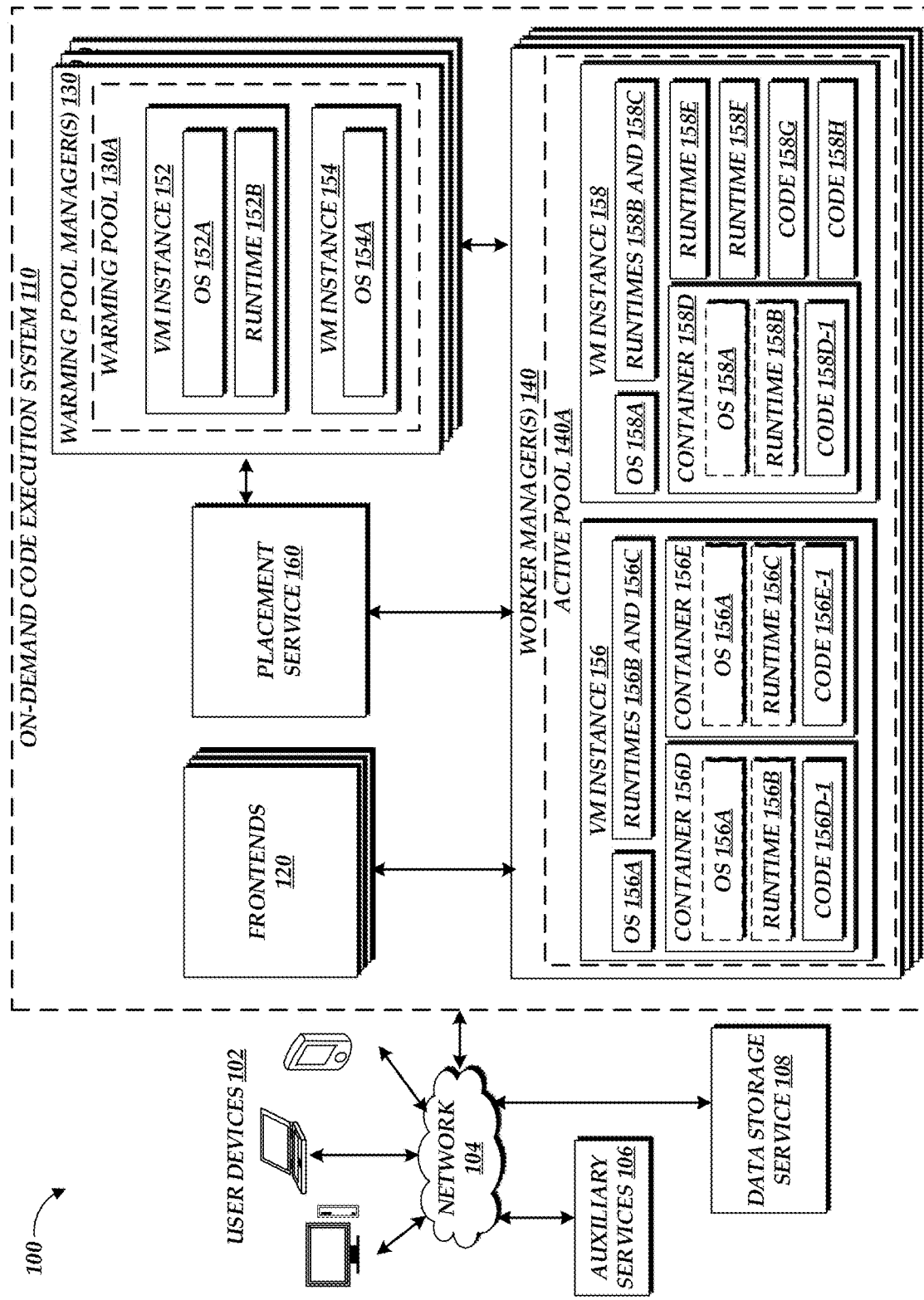
FIG. 1 is a block diagram depicting an illustrative environment in which an on-demand code execution system can operate to distribute calls to execute tasks to a set of worker managers that utilize resources of the system to execution those tasks, and in which a placement service can selectively halt distribution of or revoke allocated resources to manage demand on those resources.

Generally described, aspects of the present disclosure relate to allocating resources to on-demand code executions under scarcity conditions, when insufficient resources exist to satisfy demand of all such executions. More specifically, the present disclosure enables an on-demand code execution system to detect when resource usage of the system surpasses a threshold amount (indicating a scarcity condition), and under such conditions to allocate resources of the system according to a "constrained equal awards" rule, such that resources are divided substantially equally among individual groups of executions (e.g., a specific function being executed multiple times, a specific user account, etc.), but that no group of executions is provided more resources than requested. While some applications of the constrained equal awards rule require knowledge of the specific requests of each group prior to allocation, the embodiments disclosed herein can further allocate resources according to the constrained equal awards rule under dynamic conditions often present in on-demand code execution systems, where the requested resources associated with a group of functions may change over time. The disclosed techniques can therefore assist in "fair" resource allocation within an on-demand code execution system, preventing individual functions or users from over-utilizing those resources and inhibiting service for other functions or users.

As described herein, an on-demand code execution system enables rapid execution of source code, which may be supplied by users of the on-demand code execution system. For example, a user may submit a script in a specific programming language (e.g., the PYTHON™ language) that, when executed, implements network-based processing for a user-facing application (e.g., a mobile device "app"). The on-demand code execution system can then enable the user to submit "calls" to execute that script, at which point the system will securely execute the script to provide the desired functionality. Unlike some other network-based services, an on-demand code execution system can remove the need for a user to maintain or configure a computing device, either virtual or physical, to support code execution. Due to this lack of need for a user to maintain a device, on-demand code execution systems are sometimes referred to as "serverless" systems (though of course the on-demand code execution system itself, as opposed to individual users, may maintain servers to support code execution).

To facilitate rapid on-demand code execution, the system can maintain a variety of execution environments (e.g., virtual machine instances, software containers, etc.) pre-provisioned with software, such as an operating system, code libraries and the like, used during execution of code. Each environment may be provided with access to resources of a host computing device hosting the environment. For example, each environment may be associated with a specific amount of random access memory ("RAM") (e.g., n gigabytes), a specific amount of disk storage, a specific amount of central processing unit ("CPU") time (e.g., milliseconds per second of a host CPU), etc. Because each code execution is unlikely to utilize all resources allocated to its environment, the on-demand code execution system can increase efficiency by "over-subscribing" host resources, such that new environments are added to a host until resource usage of the host exceeds a given level (e.g., 90% used). However, a drawback of such oversubscription is that when too many environments do attempt to use the resources allocated to them, resources of the host can become insufficient to satisfy that usage by all environments. This is particularly problematic in "multi-tenanted" environments, where a single host hosts environments of multiple users. In such instances, a single user attempting to execute many resource-intensive code executions can "crowd out" other users, limiting their available resources and causing errors or detrimental execution. While "fairness" algorithms may exist to allocate resources within a single host device, these algorithms do not take into account resource usage across multiple host devices. Because an on-demand code execution system typically includes a large fleet of host devices, individual host algorithms can be ineffective to prevent over-utilization of resources of the fleet by a single actor.

Embodiments of the present disclosure address these problems by enabling allocation of resources of the on-demand code execution system according to a "constrained equal awards" rule. Under this rule, each group of executions (e.g., associated with a specific set of code or with a specific account) is allowed to use resources without restriction (or, potentially, up to static limits set for that group of execution) until a condition of scarcity exists. This condition can be set as a threshold relative to the total of a given resource of the system, such as at n % of CPU time available to the system. When overall utilization of the system reaches the threshold level, the system can revoke resources allocated to a groups of executions that represents a top resource consumer. For example, the system can halt an execution within the group, thereby reducing resource consumption associated with the group. By repeatedly halting execution of a top resource consumer, the system can achieve distribution under the constrained equal awards rule.

As an illustrative example, consider an instance in which three accounts are attempting to use CPU resources of the on-demand code execution system: a first account attempting to use 20% of the CPU resources, a second account attempting to use 35% of the CPU resources, and a third account attempting to use 45% of the CPU resources. Each amount of resource usage may represent, for example, a set of executions of code authored by the respective users (e.g., 20% usage by executions of code A, 35% by executions of code B, and 45% by executions of code C). For example, assume for simplicity that each execution attempts to utilize 5% of the CPU resources of the system. Further assume that the system is configured such that a scarcity of CPU resources exists at 91% utilization (e.g., to allow for administrative operation of the system, overhead for other processes, etc.). If each account were to use all of its requested resources, CPU utilization would reach 100%—above the desired threshold. Accordingly, the system can identify a top resource consumer—here, the 45% utilization by executions of code C (the third account)—and halt an individual execution of that code. Thus, utilization by executions of code C would drop to 40%. Because overall utilization would still be over the 90% threshold, the system can again identify a top resource consumer, which again would be executions of code C at 40% utilization. The system can therefore again halt an individual execution of that code, reducing utilization of code C to 35%. As the combined resource utilizations of code A, B, and C (at 20%, 35%, and 35% respectively) would now fall below the desired threshold, constrained equal awards allocation would be achieved.

Note that if the threshold were set to a lower level (e.g., 81%), this process could continue. In the event of a tie in resource usage, the system may be configured to select halt an instance of both top consumers, or to select one of the two via any number of potential "tie breaker" selections (e.g., random, longest running, most usage of another resource, etc.). Accordingly, at a scarcity threshold of 81%, the system may select the executions of code B as a top resource consumer, halting an execution of that code and reducing utilization by those executions to 30%. At a next iteration, the system would then select executions of code C as the top consumer, halting an execution of that code and also reducing utilization by those executions to 30%. The overall resource utilizations of code A, B, and C (at 20%, 30%, and 30% respectively) would now fall below the desired threshold, constrained equal awards allocation would be achieved. One can therefore see that as a result of constrained equal awards allocation, relatively low resource usage requests are satisfied in their entirety, while relatively high resource usage requests divide a remainder of resources equally or substantially equally.

In the present context, the term "substantially equally" refers to divisional in accordance with the techniques described herein, in which the system can deny allocation of new resources or revoke a given amount of allocated resources a top resource consumer. Thus, under high scarcity (e.g., when resources are revoked), resource usage of a top resource consumer can generally be expected to fall by a level commensurate with the amount of resources revoked, e.g., resources associated with one execution. When such resource usage makes another resource consumer the "top" resource consumer, a similar revocation can occur. Thus, while these two consumers may not be allocated exactly equal resources, resources can be assumed to be substantially equal, e.g., generally within a range commensurate with the amount of resources revoked. Similarly, under lower scarcity (e.g., when resources cease to be allocated to a top consumer), resource usage of a top resource consumer can generally be expected to stay constant, while resource usage of another consumer may rise. If such another consumer becomes a "top consumer," their usage may similarly be constrained and thus be substantially equal to the prior top consumer, though the resources of the other consumer may be higher than the prior top consumer by an amount of resources allocated to the other consumer between that consumer actually surpassing the resource usage of the prior top consumer and being identified as the new top consumer. Moreover, because some embodiments of the present disclosure relate to controlling allocation of new resources (e.g., new execution environments) or revoking less than all resources of a top consumer, the resource consumption of a top consumer may nevertheless rise or fall according to the operation of executing code associated with that top consumer. For example, even when a top consumer is prevented from obtaining a new execution environment to support a code execution, existing executions of the top consumer may nevertheless modify their resource usage, for example by increasing or decreasing use of processors. Two consumers each identified as top resource consumers during scarcity conditions may nevertheless be considered to have been allocated substantially equal amounts of computing resources despite such variances.

One advantage of the techniques described herein is that they continue to function under varying levels of resource requests, and handle fluctuations in resource request levels over time. Accordingly, in the examples given above, there is no requirement that each of the first, second, and third accounts initially state their desired resource allocation. Rather, code executions may simply continue to utilize resources until a scarcity condition is met, at which point the system can allocate resources accordingly. Because allocation can be based on current resource utilization, should requirements change during allocation of resources (e.g., between iterations), the allocation will be altered to address that change. For example, if a given group of executions reduces its resource usage such that a scarcity threshold is not met, revocation of resources can cease. Furthermore, because each iteration of the allocation process can be configured to revoke resources according to a set metric, such as a single code execution, the allocation process can smoothly handle changes in resource utilization. Accordingly, in the above example, each iteration of the allocation process can result in a single execution being terminated, reducing any disruptive effects of such halting, rather than attempting to achieve a desired allocation in a single iteration. A speed of iterations may be set according to the desired aggressiveness of resource deallocation.

One potential issue with the above-noted approach in the context of an on-demand code execution system is the potential for a given group of executions (e.g., a user or specific set of code) to continue to request new resources, even as resources are revoked from the group. For example, if the system halts execution of code C in the example above, the third account may simply call for a new execution of code C, potentially again increasing resource usage to the threshold amount. To address this, embodiments of present disclosure may utilize an additional scarcity threshold below the threshold described above, at which allocation of new resources to a group of executions is halted. For example, where a threshold for revocation of resources is set at 90%, a threshold for halting allocation may be set at 80%. In addition to the allocations described above, when the lower threshold is met, the system can be configured to halt allocation of new resources to a top resource consumer until the system falls below the lower threshold. Because that top consumer cannot obtain new resources, at a subsequent iteration, the system may identify a new top resource consumer, and similarly halt allocation of new resources. In this way, the system can prevent a top resource consumer from simply continuing to request new resources. Beneficially, halting allocation of new resources may be less disruptive to operation of the system than revoking allocated resources, as new executions of code may simply be denied to relevant consumers.

As will be appreciated by one of skill in the art in light of the present disclosure, the embodiments disclosed herein improves the ability of computing systems, such as on-demand code execution systems, to allocate computing resources under conditions of scarcity, preventing individual resource consumers (e.g., tasks or accounts) from monopolizing resources and inhibiting operation of the system for other users. Moreover, the presently disclosed embodiments address technical problems inherent within computing systems; specifically, the limited nature of computing resources in handling multiple concurrent code executions and the inherent complexities in allocating resources when requested resources exceed available resources. These technical problems are addressed by the various technical solutions described herein, including the use of a resource allocation routine that allocates resources according to a constrained equal awards allocation and that operates based on a current resource usage level, accounting for the dynamic nature of resource utilization inherent within operation an on-demand code execution system. Thus, the present disclosure represents an improvement on an on-demand code execution system and computing systems in general.

The general operation of the on-demand code execution system will now be discussed. Specifically, the on-demand code execution system disclosed herein may enable users to create request-drive services, by submitting or designating computer-executable source code to be executed by virtual machine instances on the on-demand code execution system in response to user requests to access such services. Each set of code on the on-demand code execution system may define a "task" (which in some instances may be referred to herein as a "function") and implement specific functionality corresponding to that task when executed on a virtual machine instance of the on-demand code execution system (e.g., functionality of a network-based service). Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

Specifically, to execute tasks, the on-demand code execution system described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a call to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution system may include a virtual machine instance manager (a "worker manager") configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance, and provisioning the containers with code of the task as well as dependency code objects. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108.

By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programing interfaces (API), and/or other programmatic interfaces for generating and uploading user-executable source code (e.g., including metadata identifying dependency code objects for the uploaded code), invoking the user-provided source code (e.g., submitting a request to execute the source code on the on-demand code execution system 110), scheduling event-based jobs or timed jobs, tracking the user-provided source code, and/or viewing other logging or monitoring information related to their requests and/or source code. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the on-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be invoked by code execution on the on-demand code execution system 110, such as by API calls to the auxiliary services 106. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. For example, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store information corresponding to a task, such as source code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontends 120 may be connected to the network 104, and other components of the on-demand code execution system 110 may communicate with other components of the environment 100 via the frontends 120.

In FIG. 1, users, by way of user computing devices 102, may interact with the on-demand code execution system 110 to provide source code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

To enable interaction with the on-demand code execution system 110, the system 110 includes multiple frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable source code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the source code specified in the request.

References to source code as used herein may refer to any program code (e.g., a program, routine, subroutine, thread, etc.) written in a specific program language. In the present disclosure, the terms "source code," "user code," and "program code," may be used interchangeably. Source code which has been compiled for execution on a specific device is generally referred to herein as "machine code." Both "source code" and "machine code" are representations of the same instructions, which may be collectively referred to as "code." Such code may be executed to achieve a specific function, for example, in connection with a particular web application or mobile application developed by the user. As noted above, individual collections of code (e.g., to achieve a specific function) are referred to herein as "tasks," while specific executions of that code are referred to as "task executions" or simply "executions." Source code for a task may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the source code (or the location thereof) to be executed and one or more arguments to be used for executing the source code. For example, a call may provide the source code of a task along with the request to execute the task. In another example, a call may identify a previously uploaded task by its name or an identifier. In yet another example, source code corresponding to a task may be included in a call for the task, as well as being uploaded in a separate location (e.g., storage of an auxiliary service 106 or a storage system internal to the on-demand code execution system 110) prior to the request being received by the on-demand code execution system 110. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the source code and any libraries (and/or identifications of storage locations thereof) corresponding to the task requested for execution. In some embodiments, the call includes metadata that indicates the source code of the task to be executed, the language in which the source code is written, the user associated with the call, and/or the computing resources (e.g., memory, etc.) to be reserved for executing the source code. For example, the source code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code sets may also be associated with permissions or authorizations. For example, a third party may submit a code object and designate the object as readable by only a subset of users. The on-demand code execution system 110 may include functionality to enforce these permissions or authorizations with respect to code sets.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface 122). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

To execute tasks, the on-demand code execution system 110 includes one or more warming pool managers 130, which "pre-warm" (e.g., initialize) virtual machine instances in an attempt to enable tasks to be executed quickly, without the delay caused by initialization of the virtual machines. The on-demand code execution system 110 further includes one or more worker managers 140, which manage active virtual machine instances (e.g., currently assigned to execute tasks in response to task calls). While not shown in FIG. 1, each virtual machine instance is illustratively hosted on a physical host computing device, sometimes referred to herein as a "worker." The warming pool managers 130 and worker managers 140—each of which are also illustratively implemented as physical or virtual-on-physical devices—illustratively maintain state information regarding instances that they are currently managing, and can communicate with one another to alter management of an instance. For example, a worker manager 140 may communicate with a warming pool manager 130 to transfer management of an instance, such that the manager 140 can instruct the instance (on a worker) to execute code of a task. Thus, while instances are shown for illustrative purposes as being "on" the warming pool managers 130 or worker managers 140, these instances may not exist on the same physical device as the respective managers 130 and 140, and thus "transfer" of instances may not require relocation of the instance, but rather simply a change in the manager 130/140 that manages the instance.

The warming pool managers 130 can generally be configured to attempt to ensure that virtual machine instances are ready to be used by the worker managers 140 when the on-demand code execution system 110 detects an event triggering execution of a task on the on-demand code execution system 110. In the example illustrated in FIG. 1, each warming pool manager 130 manages a corresponding warming pool 130A, which is a group (sometimes referred to as a pool) of pre-initialized and pre-configured virtual machine instances that may be used to execute tasks in response to triggering of those tasks. In some embodiments, the warming pool managers 130 cause virtual machine instances to be booted up on one or more physical computing machines within the on-demand code execution system 110 and added to a corresponding warming pool 130A. For example, each warming pool manager 130 may cause additional instances to be added to the corresponding warming pool 130A based on the available capacity in the corresponding warming pool 130A to service incoming calls. The warming pool managers 130 may further work in conjunction with other components of the on-demand code execution system 110, such as the worker managers 140, to add or otherwise manage instances and/or containers in the warming pools 130A based on received pre-trigger notifications. In some embodiments, the warming pool managers 130 may use both physical computing devices within the on-demand code execution system 110 and one or more virtual machine instance services to acquire and maintain compute capacity that can be used to service calls received by the frontends 120. Further, the on-demand code execution system 110 may comprise one or more logical knobs or switches for controlling (e.g., increasing or decreasing) the available capacity in the warming pools 130A. For example, a system administrator may use such a knob or switch to increase the capacity available (e.g., the number of pre-booted instances) in the warming pools 130A during peak hours. In some embodiments, virtual machine instances in the warming pools 130A can be configured based on a predetermined set of configurations independent from a specific call to execute a task. The predetermined set of configurations can correspond to various types of virtual machine instances to execute tasks. The warming pool managers 130 can optimize types and numbers of virtual machine instances in the warming pools 130A based on one or more metrics related to current or previous task executions.

As shown in FIG. 1, instances may have operating systems (OS) and/or language runtimes loaded thereon. For example, the warming pool 130A managed by a warming pool manager 130 can comprise instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.). Although the instance 152 is shown in FIG. 1 to include a single runtime, in other embodiments, the instances depicted in FIG. 1 may include two or more runtimes, each of which may be used for running a different user code. In some embodiments, the warming pool managers 130 may maintain a list of instances in a corresponding warming pool 130A. The list of instances may further specify the configuration (e.g., OS, runtime, container, etc.) of the instances.

In some embodiments, the virtual machine instances in a warming pool 130A may be used to serve any user's calls. In one embodiment, all the virtual machine instances in a warming pool 130A are configured in the same or substantially similar manner. In another embodiment, the virtual machine instances in a warming pool 130A may be configured differently to suit the needs of different users. For example, the virtual machine instances may have different operating systems, different language runtimes, and/or different libraries loaded thereon. In yet another embodiment, the virtual machine instances in a warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby.

The warming pool managers 130 may pre-configure the virtual machine instances in a warming pool 130A, such that each virtual machine instance is configured to satisfy at least one of the operating conditions that may be requested or specified by a user when defining a task. In one embodiment, the operating conditions may include program languages in which the potential source code of a task may be written. For example, such languages may include Java, JavaScript, Python, Ruby, and the like. In some embodiments, the set of languages that the source code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pools 130A are usable by which user), among other specified conditions.

One or more worker managers 140 manage the instances used for servicing incoming calls to execute tasks. In the example illustrated in FIG. 1, each worker managers 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the runtimes may also be user provided. A runtime—sometimes referred to as a runtime system—generally includes a set of software designed to support execution of source code written in a given computer language. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool 130A (e.g., including the number and type of instances). In other embodiments, the worker managers 140 requests compute capacity from a warming pool manager 130 without having knowledge of the virtual machine instances in a warming pool 130A.

In the example illustrated in FIG. 1, tasks are executed in isolated execution environments referred to as containers (e.g., containers 156D, 156E, 158D). Containers are logical units created within a virtual machine instance using the resources available on that instance. For example, each worker manager 140 may, based on information specified in a call to execute a task, create a new container or locate an existing container in one of the instances in an active pool 140A and assigns the container to the call to handle the execution of the task. In one embodiment, such containers are implemented as Linux containers.

Once a triggering event to execute a task has been successfully processed by a frontend 120, the frontend 120 passes a request to a worker manager 140 to execute the task. On receiving a request to execute a task, a worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D) (e.g., a "warm" container), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the source code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140A does not contain any instances currently assigned to the user, the worker manager 140 may request a new virtual machine instance from the warming pool 130A, assign the instance to the user associated with the triggered task, create a new container on the instance, assign the container to the triggered task, and cause the source code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution system 110 is adapted to begin execution of a task within a time period that is less than a predetermined duration if one or more conditions are satisfied. For example, the one or more conditions may include any one of: (1) the source code of the task is loaded on a container in the active pool 140A at the time the request is received; (2) the source code of the task is stored in the code cache of an instance in the active pool 140A at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 Patent, incorporated by reference above (e.g., at FIG. 4 of the '556 Patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

To facilitate interactions between warming pool managers 130 and worker managers 140, the system 110 of FIG. 1 further includes a placement service 160. The placement service 160 in FIG. 1 can represent one or more devices configured to obtain requests from the worker manager 140 for a new virtual machine instance from the warming pool 130A, to identify an appropriate instance from the warming pool 130A, and to assign that instance to the requesting worker manager 140. As noted above, requesting of a new instance may generally occur when the active pool 140A does not contain an appropriate environment in which to execute code.

In accordance with embodiments of the present disclosure, the placement service 160 can further be configured to halt or revoke allocation of resources to a resource consumer under conditions of scarcity. As used herein, the term resource consumer can refer to a group of related executions that are considered as a group for purposes of resource allocation. For example, each resource consumer may represent an individual account on the system 110. In another example, each resource consumer may represent an individual task on the system 110 (which may be executed multiple times to result in multiple concurrent executions). Specifically, the placement service 160 may periodically (e.g., at each n seconds) gather resource usage data from the worker managers 140 and determine whether a scarcity threshold has been met. If so, the service 160 can aggregate the resource usage data by resource consumer, and take action with respect to a top resource consumer commensurate with the reached scarcity threshold. For example, at a first threshold, the service 160 may decline to allocate new resources for the consumer (e.g., decline to vend new VM instances to worker managers 140 to facilitate execution of code corresponding to the consumer) until resource utilization falls below the first threshold. At a second threshold, the service 160 may revoke allocated resources (e.g., terminate a code execution or an environment for a code execution) to the top consumer. In this manner, the placement service 160 can operate to maintain a desired resource usage level at the system 110 while ensuring that individual resource consumers do not monopolize resources of the system 110 and inhibit access to the system 110 by other consumers.

In some embodiments, the on-demand code execution system 110 may provide data to one or more of the auxiliary services 106 as it executes tasks in response to triggering events. For example, the frontends 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information and/or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor and/or log various inputs, outputs, or other data and parameters on behalf of the tasks being executed on the on-demand code execution system 110.

In some embodiments, the worker managers 140 may perform health checks on the instances and containers managed by the worker managers 140 (e.g., those in a corresponding active pool 140A). For example, the health checks performed by a worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, a worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, a worker manager 140 may perform similar health checks on the instances and/or containers in a warming pool 130A. The instances and/or the containers in a warming pool 130A may be managed either together with those instances and containers in an active pool 140A or separately. In some embodiments, in the case where the health of the instances and/or the containers in a warming pool 130A is managed separately from an active pool 140A, a warming pool manager 130, instead of a worker manager 140, may perform the health checks described above on the instances and/or the containers in a warming pool 130A. Additionally or alternatively, another element of the system 110, such as the placement service 160, may conduct health checks in accordance with the above.

In the depicted example, virtual machine instances ("instances") 152, 154 are shown in a warming pool 130A managed by a warming pool manager 130, and instances 156, 158 are shown in an active pool 140A managed by a worker manager 140. The illustration of the various components within the on-demand code execution system 110 is logical in nature and one or more of the components can be implemented by a single computing device or multiple computing devices. For example, the instances 152, 154, 156, 158 can be implemented on one or more computing devices (which may be referred to herein as "host devices"), which may themselves be located in different various geographic regions. Each host device may be a physical computing device or a virtual computing device itself hosted by a physical computing device. Further, each host device can be configured to maintain a set of execution environments (e.g., instances or containers), which may be assigned to a worker manager 140 (and thus become part of the active pool 140A) by, for example, the placement service 160. The worker manager 140 to which an environment is assigned may thereafter communicate with the appropriate host device in order to control operation of the environment. While shown as an individual set of elements in FIG. 1, in some instances the warming pool managers 130 may be implemented in a distributed manner. For example, rather than providing a dedicated device to act as a warming pool manager 130, some embodiments may include host devices configured to individually "warm" environments on the host device, in the manner described above with reference to the warming pool managers 130. Thus, each host device may locally implement functionality of a warming pool manager 130, and the warming pool 130A may represent a set of warmed environments across the host devices.

Further, each frontend 120, warming pool manager 130, placement service 160, and worker manager 140 can be implemented across multiple physical computing devices. Alternatively, one or more of a frontend 120, a warming pool manager 130, a placement service 160, and a worker manager 140 can be implemented on a single physical computing device. Although four virtual machine instances are shown in the example of FIG. 1, the embodiments described herein are not limited as such, and one skilled in the art will appreciate that the on-demand code execution system 110 may comprise any number of virtual machine instances implemented using any number of physical computing devices. Similarly, although multiple warming pools 130A and active pools 140A are shown in the example of FIG. 1, the embodiments described herein are not limited as such, and one skilled in the art will appreciate that the on-demand code execution system 110 may comprise any number of warming pools and active pools.

While some functionalities are generally described herein with reference to an individual component of the on-demand code execution system 110, other components or a combination of components may additionally or alternatively implement such functionalities. For example, frontends 120 may operate in a peer-to-peer manner to provide functionality corresponding to the placement service 160, as opposed to including a distinct service 160.

Figure 2:
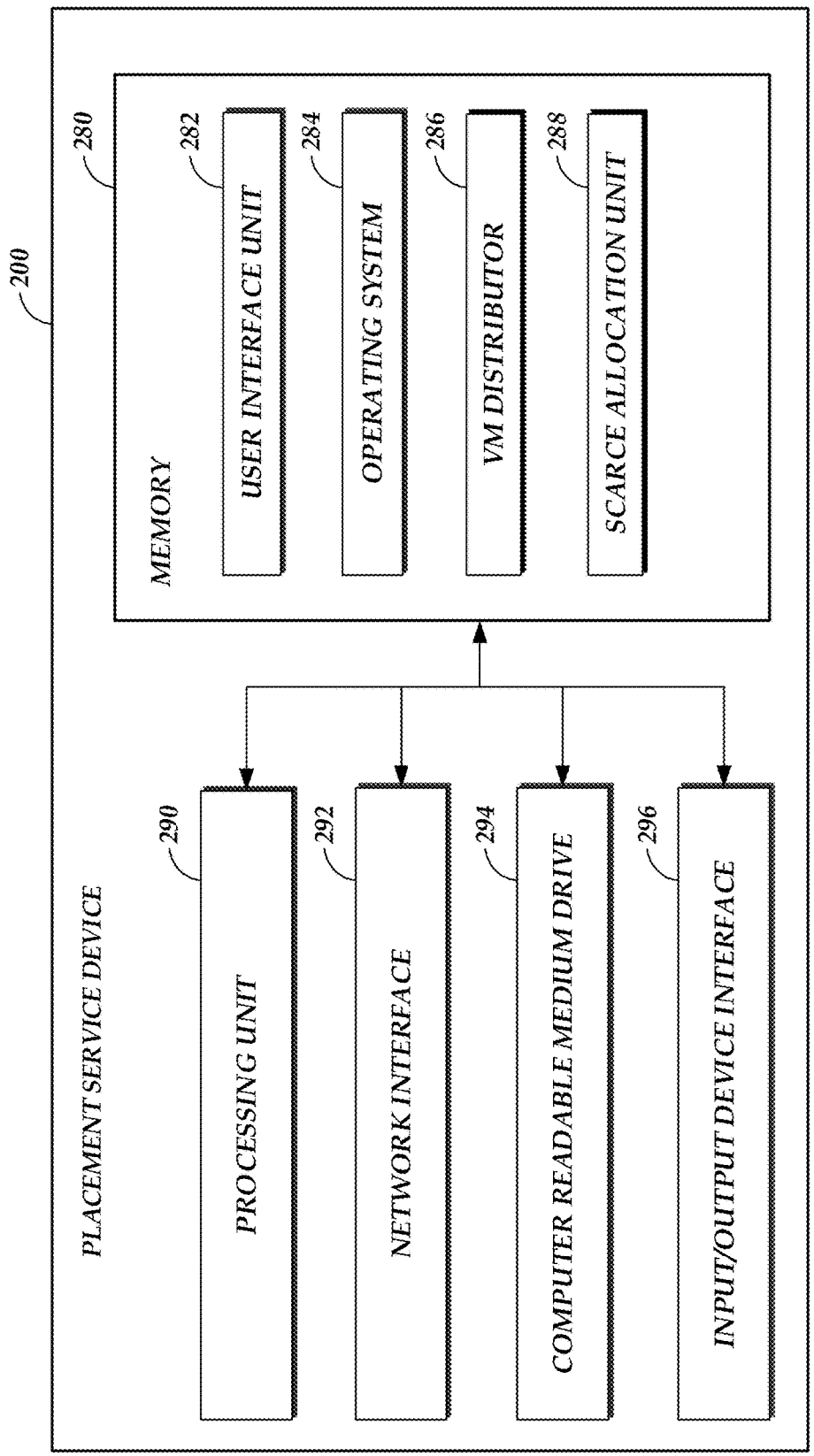
FIG. 2 depicts a general architecture of a computing device providing a placement service that is configured to manage resource allocation on the on-demand code execution system of FIG. 1 by selectively halting distribution of or revoking allocated resources.

FIG. 2 depicts a general architecture of a computing system (referenced as placement server device 200) that implements the placement service 160. The general architecture of the placement server device 200 depicted in FIG. 2 includes an arrangement of computer hardware and software modules that may be used to implement aspects of the present disclosure. The hardware modules may be implemented with physical electronic devices, as discussed in greater detail below. The frontend 120 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the placement server device 200 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as modules in some embodiments) that the processing unit 290 executes in order to implement one or more aspects of the present disclosure. The memory 280 generally includes random access memory (RAM), read only memory (ROM) and/or other persistent, auxiliary or non-transitory computer readable media. The memory 280 may store an operating system 284 that provides computer program instructions for use by the processing unit 290 in the general administration and operation of the placement service 160. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition, the memory 280 may include and/or communicate with one or more data repositories (not shown), for example, to access user program codes and/or libraries.

In addition to and/or in combination with the user interface unit 282, the memory 280 may include a VM distributor 286 and scarce allocation unit 288 that may be executed by the processing unit 290. In one embodiment, the VM distributor 286 is executable to select, for a given request for VM instance from a worker manager 140, an appropriate VM instance within the warming pool 130A, and to allocate the instance to the manager 140. The scarce allocation unit 288 illustratively implements various aspects of the present disclosure (e.g., the routine of FIG. 5) to allocate resources of the system 110 under scarcity conditions.

In some embodiments, the placement server device 200 may further include components other than those illustrated in FIG. 2. For example, the memory 280 may further include a code executable to implement functionalities of a frontend 120, worker manager 140, warming pool manager 130, etc.

Figure 3:
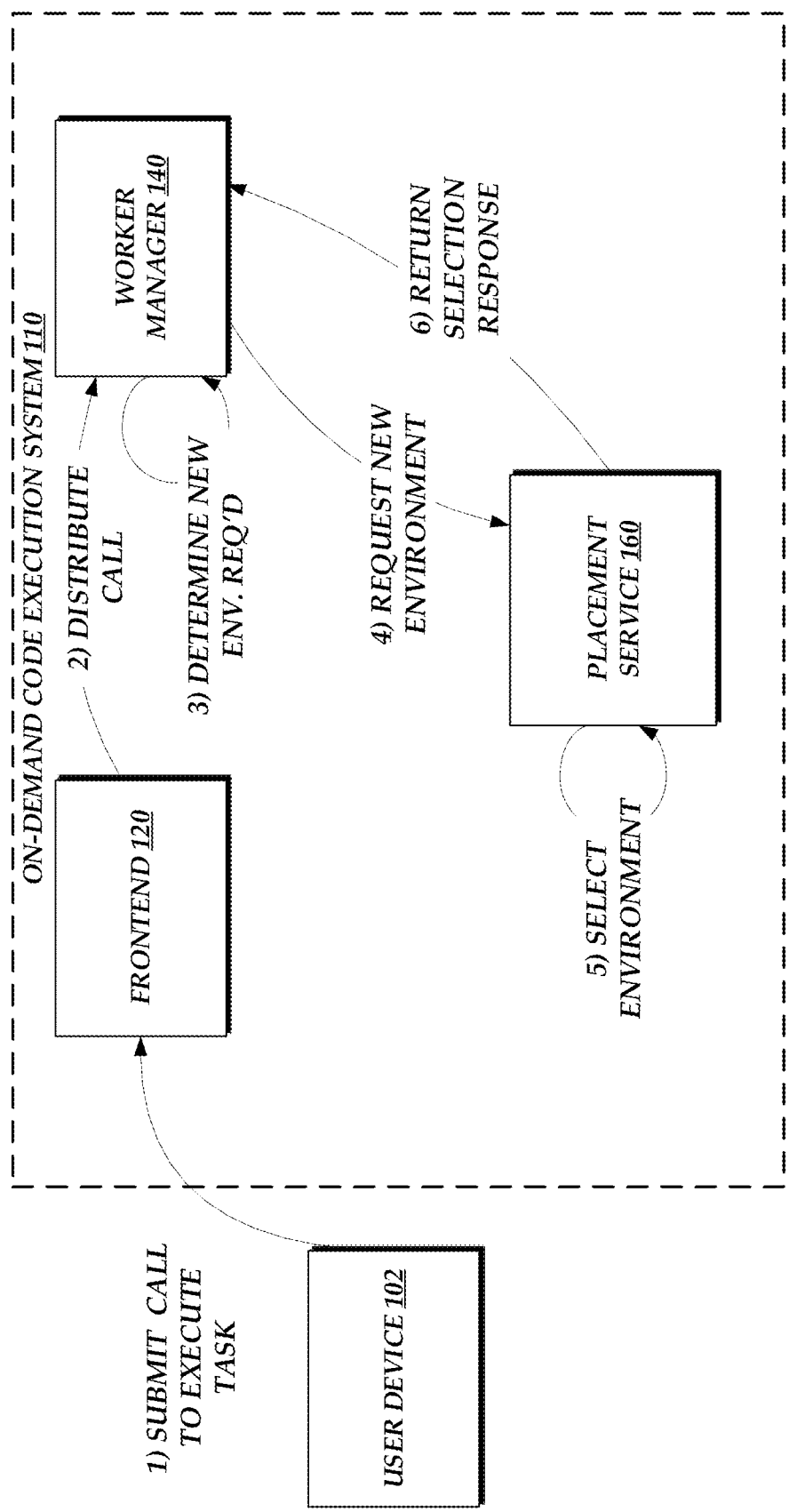
FIG. 3 is a flow diagram depicting illustrative interactions for allocating resources on the on-demand code execution system of FIG. 1 in response to a request to execute a task on the on-demand code execution system.

With reference to FIG. 3, illustrative interactions are depicted for handling a request to execute a task on the on-demand code execution system 110, including operation of the placement service 160 to allocate an execution environment for such execution to a worker manager 140.

The interactions of FIG. 3 begin at (1), where a user device 102 submits a call to the frontend 120 to execute the task. Submission of a request may include transmission of specialized data to the frontend 120, such as a HTTP packet or API call referencing the task. While the interactions of FIG. 3 are described as including an explicit request to execute the task by the user device 102, requests to execute the task may occur in a variety of manners, including submission of a call by auxiliary services 106 (not shown in FIG. 3) or generation of a call by the on-demand code execution system 110 (e.g., based on a rule to call the alias when specific criteria are met, such as elapsing of a period of time or detection of data on an auxiliary service 106). The request may include any information required to execute the task, such as parameters for execution, authentication information under which to execute the task or to be used during execution of the task, etc.

At (2), frontend 120 distributes the call to a worker manager 140. The frontend 120 may implement various functionalities to distribute the call, such as selecting the worker manager 140 based on random selection, load, etc. In some instances, the frontend 120 may maintain information identifying a worker manager 140 previously associated with a called task, and distribute the call to that worker manager 140. Various additional functionalities that may be implemented by a frontend 120 to distribute calls to a worker manager 140 are described, for example, in U.S. patent application Ser. No. 16/698,829, entitled "SERVERLESS CALL DISTRIBUTION TO UTILIZE RESERVED CAPACITY WITHOUT INHIBITING SCALING," which is hereby incorporated by reference in its entirety.

In some instances, the worker manager 140 may determine that an appropriate environment (e.g., a VM instance or container) already exists within its associated active pool 140A, and may thus execute an instance of the called task within that environment. However, for purposes of the present description, it will be assumed that no such environment exists. Accordingly, at (3), the manager 140 determines that a new execution environment is required to service the call. The manager 140 therefore, at (4), requests the new environment from the placement service 160.

Thereafter, at (5), the placement service 160 selects an appropriate environment (e.g., from the warming pool 130A), and returns a response to the manager 140 at (6). Where selection succeeds, the response to the manager 140 may include, for example, identifying information of the environment or a host device of the environment (e.g., a virtual machine hosting a container, a "bare metal" physical server hosting a VM or a container, etc.), which the manager 140 may utilize to instruct the environment to initiate an execution of the called task. Thus, an execution of the task may begin, fulfilling the call from the user device 102.

Alternatively, in accordance with embodiments of the present disclosure, the placement service 160 may determine under scarcity conditions that the request for a new environment should be denied. For example, the placement service 160 may have previously determined, such as via the interactions of FIG. 4, that the utilization of the system 110 (e.g., across all environments) has exceeded a first threshold level with respect to a given resource. The system 110 may have therefore identified a top resource consumer of that resource, and halted allocation of new resources to that resource consumer. Where the called task is associated with that resource consumer, such as where the task is the resource consumer or the task is executed under an account of the resource consumer, the placement service 160 can determine, at (5), that no environment should be allocated. This response can then be returned to the manager 140, at (6). The manager 140 may in turn notify the frontend 120 of a failure to execute the task, which may also be communicated to the user device 102 (e.g., as an error of insufficient resources). Thus, where the called task is already consuming excessive resources of the system 110, the task can be prevented from consuming more resources that might otherwise inhibit operation of the service for other tasks.

Figure 4:
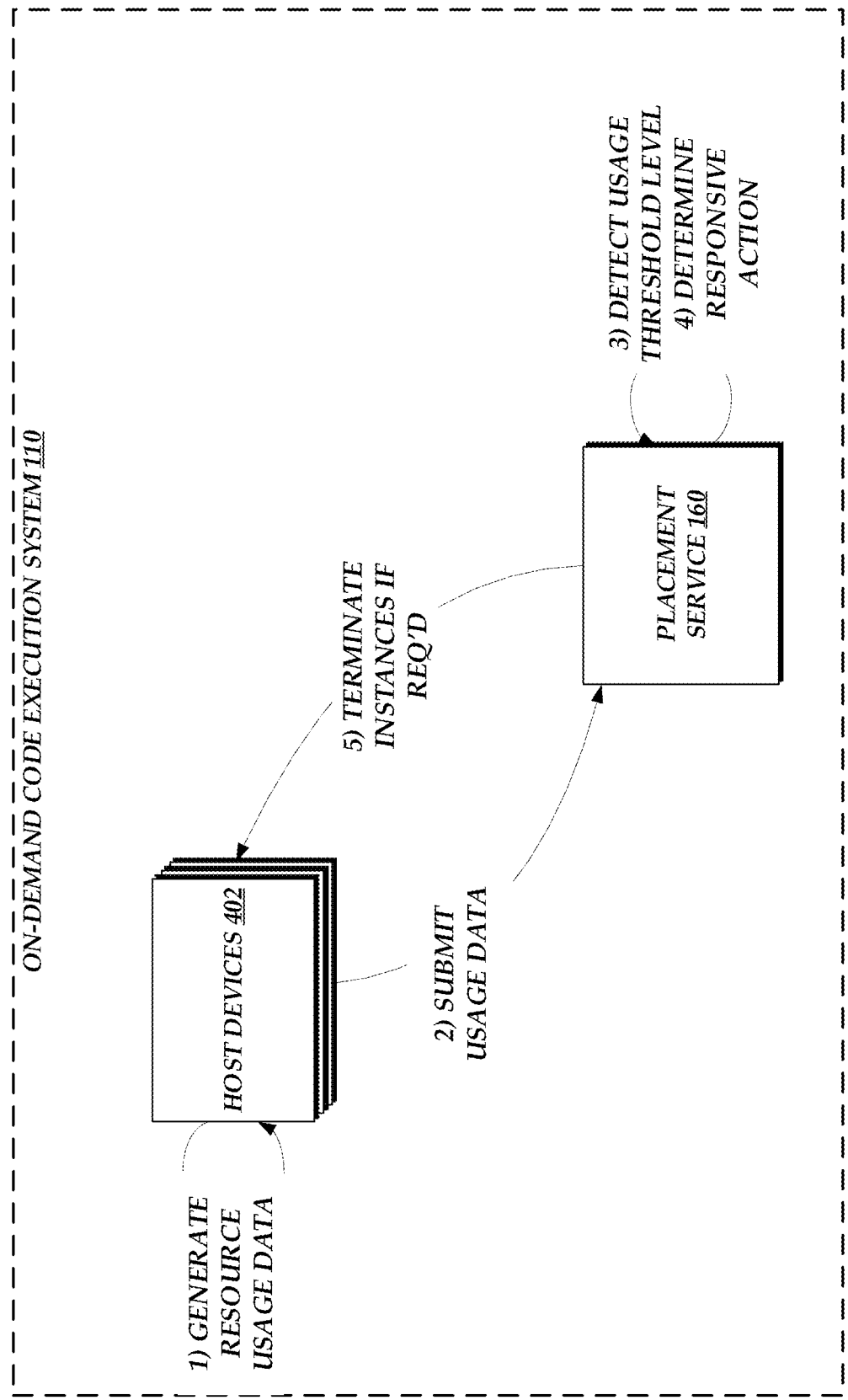
FIG. 4 is a flow diagram depicting illustrative interactions for determining when to selectively halt distribution of or revoke allocated resources on the on-demand code execution system of FIG. 1.

With reference to FIG. 4, illustrative interactions are depicted for implementing resource allocation decisions at a placement service 160, enabling the placement service to halt or revoke allocation of resources to a resource consumer. The resource consumer may represent, for example, an individual task on the on-demand code execution system 110, an individual account on the system 110, a group of tasks or accounts, or any other logical grouping of executions on the system 110.

The interactions of FIG. 4 begin at (1), where the host devices 402 generate resource usage data reflecting usage of computing resources by environments within the active pool 140A, each of which is associated with an execution of a task. Host devices 402 illustratively represent computing devices configured to host execution environments, such as "bare metal" servers or virtual computing devices (themselves hosted by a physical computing device) executing a hypervisor. While a single active pool 140A is discussed herein for simplicity, embodiments of the present disclosure may also operate with respected to multiple active pools 140A. References to a single active pool 140A should therefore generally be understood to potentially refer to multiple active pools 140A in aggregate.

In one embodiment, resource usage is reflective of use of a single computing resource, such as CPU usage (e.g., measured in active time), RAM usage, network bandwidth usage, drive input/output operations per second (IOPS), etc. In another embodiment, resource usage is reflective of a combination of multiple computing resources. In one embodiment, resource usage is generated at the level of individual task executions currently executing within the active pool 140A. For example, the generated resource usage may indicate that a first execution of task A is consuming n milliseconds per second of one CPU within the active pool 140A, a second execution of task A is consuming m milliseconds per second of one CPU within the active pool 140A, a first execution of task B is consuming n milliseconds per second of two CPUs within the active pool 140A, etc. In another embodiment, the generated resource usage may be grouped by resource consumer. For example, where resource consumption is grouped by task, the generated resource usage may indicate that task A is consuming Σn milliseconds per second of CPU time within the active pool 140A, wherein n represents the individual CPU time used by execution of task A. Resource usage is illustrative generated as an absolute value, but may also be generated as relative to the total resources available to the active pool 140A. In some embodiments, resource usage data may include a total available amount of resources of the active pool 140A. In other embodiments, the placement service 160 may separately maintain information indicating the total available amount of resources of the active pool 140A.

At (2), the worker managers 140 transmit the usage data to the placement service 160 for use in implementing resource allocation decisions. Accordingly, at (3), the placement service 160 uses the usage data to determine whether a threshold level associated with a scarcity condition has been met on the system 110A. The threshold levels are illustratively set relative to a total available amount of one or more resources of the active pool 140A. The service 160 can therefore determine whether a threshold level has been met by comparing a sum of resources used, as indicated in the resource usage data, against the total available amount of those resources of the active pool 140A.

Illustratively, where two threshold levels associated with scarcity are configured on the service 160, potential states of the system 110 may be categorized as "scarcity level 0" to indicate that neither of the two threshold levels has been met, "scarcity level 1" to indicate that a first threshold has been met, and "scarcity level 2" to indicate that a second threshold has been met. In one embodiment, the first threshold is set as 80% resource usage on the system 110 (e.g., CPU usage), and the second threshold is set as 90% resource usage on the system 110.

Thereafter, at (4), the service 160 determines a responsive action to be taken based on the detected threshold level. For example, where a first threshold level has been met, the service 160 may identify a top resource consumer and add that resource consumer to a "halt" list, causing new requests for environments associated with the consumer that are obtained at the service 160 to be denied. Accordingly, where an individual task or account is consuming excess resources at the system 110, adding that task or account to a halt list can prevent the task or account from continuing to consumer resources and inhibit operation of the service for other tasks or consumers. As another example, where a second threshold level has been met, the service 160 may identify a top resource consumer and halt an execution associated with that top resource consumer. For example, as shown in (5), the service 160 can transmit a call to a worker manager 140 to halt that execution. In one embodiment, the halted execution is selected at random from among executions associated with the resource consumer. In another embodiment, the service 160 selects the execution to halt based, for example, on resource usage associated with the execution (e.g., as an execution using the most resources). In some embodiments, the responsive actions of each threshold level may be implemented independently, such that only a responsive action for a current threshold level is implemented. In another embodiment, the responsive actions of each threshold level may be cascading, such that a responsive action is taken for each met threshold level (e.g., both the action for level 2 and level 1 when the threshold for level 2 is met). When no resource threshold is met (e.g., the system 110 is in scarcity level 0), the service 160 can take a responsive action corresponding to that determination, such as clearing the halt list noted above.

In one embodiment, the service 160 identifies a top resource consumer by grouping and summing the usage data according to a grouping criteria for the consumers, such as grouping and summing usage data by task where each consumer is a task or grouping and summing usage data by account when each consumer is an account. The service 160 can then sort the grouped and summed usage data to identify a consumer with a top resource usage. While embodiments are discussed herein with reference to a single "top" consumer, in some instances the service 160 may be configured to select a top n consumers (e.g., top 2, 3, 4, etc.). In instances where multiple top consumers are associated with the same resource usage, the service 160 can apply a tie breaking selection to those top consumers, any number of which may be used. For example, the service 160 may select from the multiple top consumers randomly, based on a duration of resource usage, etc.

While a top resource consumer may be selected based on absolute resource usage according to some embodiments, in other embodiments a top resource consumer may be selected based on relative usage. For example, the placement service 160 may be configured to store historical usage metrics associated with top consumers (e.g., an average usage over a past period of time), and the service 160 may measure, for each resource consumer, a variance from that historical usage. Illustratively, the service 160 may determine, for each consumer, an amount of resource usage in excess of an average historical usage (e.g., in percentage or absolute terms). Thus, if a first consumer is using significantly more resources than their average past usage, they may be ranked higher than a second consumer using resources in line with their average past usage even when the absolute usage of the second consumer is higher. While averages are used as an example statistical metric, other statistical measures may also be used to measure and detect anomalous usage of a resource consumer. In some instances, the service 160 may be configured with to enforce usage thresholds when implementing usage ranking relative to historical metrics, such that consumers with a current usage below a usage threshold are excluded from the ranking, for example. Use of usage thresholds may illustratively inhibit new consumers that are not otherwise using excessive resources from being identified as a top resource consumer.

Figure 5:
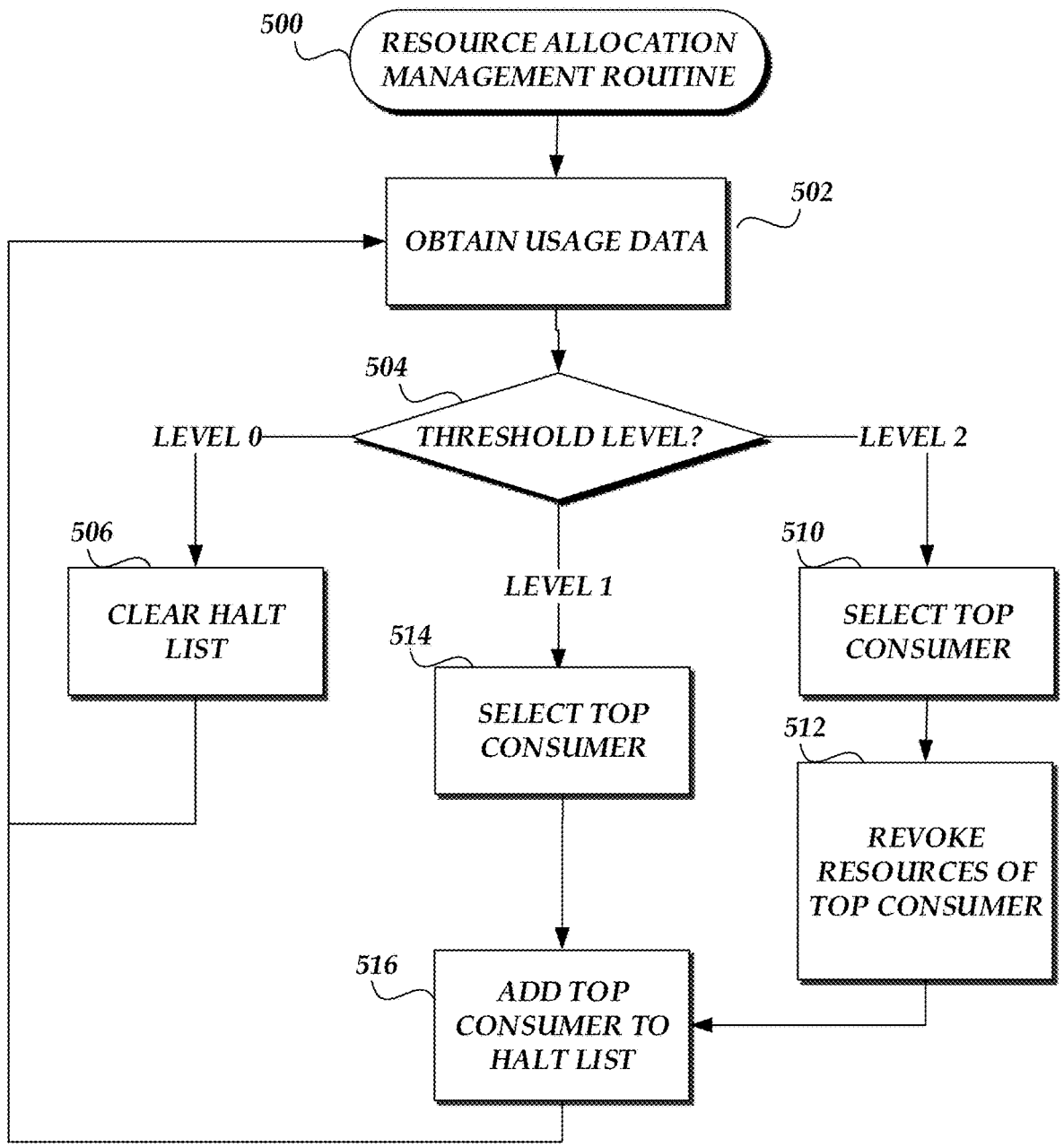
FIG. 5 is a flow chart depicting an illustrative routine for selectively halting distribution of or revoking allocated resources on the on-demand code execution system of FIG. 1.

With reference to FIG. 5, an illustrative routine 500 for selectively halting distribution of or revoking allocated resources on the on-demand code execution system 110 will be described. The routine 500 may be implemented, for example, by the placement service 160 of FIG. 1.

The routine 500 begins at block 502, where the placement service 160 obtains usage data for an active pool 140A of the system 110. As discussed above, the usage data may be generated by worker managers 140 (or host devices under instruction of worker managers 140) and may generally reflect use of one or more computing resources by task executions within the active pool 140A.

At block 504, the placement service 160 determines whether a threshold level associated with a scarcity condition has been met on the system 110. Illustratively, the placement service 160 may compare a total resource usage reflected in the usage data with a total resource availability of the active pool 140A to determine a percentage of resources used, and may then compare that percentage to one or more thresholds to determine the threshold level.

In the instance that no scarcity condition exists (e.g., the usage data does not meet any threshold level, indicated in FIG. 5 as "level 0"), the routine 500 proceeds to block 506, where the placement service 160 takes an action responsive to that condition—specifically, clearing a list of resource consumers halted from having additional resources allocated to executions of those consumers. The routine 500 the returns to block 502. The routine 500 illustratively proceeds as an "infinite loop" during operation of the placement service 160. The service 160 illustratively implements each iteration of the loop on fixed intervals, such as every n seconds.

In the instance that a first threshold level but not a second threshold level has been met (indicated in FIG. 5 as "level 1"), the routine 500 proceeds to block 514, where the placement service 160 selects a top resource consumer. As discussed above, selection of a top consumer can generally include grouping resource usage data by grouping criteria for consumers (e.g., grouping by task or account), summing the resource usage data for each consumer, and sorting the consumers by the summed resource usage data. In some instances, consumers may be sorted based on absolute resource usage. In other instances, consumers may be sorted based on relative usage, e.g., relative to a historical usage level of that consumer.

Thereafter, at block 516, the placement service 160 adds the selected top consumer to a "halt list," indicating that requests for resource (e.g., new execution environments) for executions associated with the consumer are to be denied by the service 160. As discussed above, inclusion of a consumer in the halt list will inhibit that consumer from continuing to use additional resources of the system 110, thus attempting to slow overall resource usage of the system 110 and preserve functionality of the system 110 for other users. The routine 500 then returns to block 502 as discussed above.

In the instance that a second threshold level has been met (indicated in FIG. 5 as "level 2"), the routine 500 proceeds to block 510, where the placement service 160 selects a top resource consumer in a manner similar to block 514, discussed above. Thereafter, at block 512, the service 160 revokes resources of the top resource consumer. In one embodiment, revocation of resources can include transmission of an instruction to end one or more executions corresponding to the top resource consumer. As discussed above, the one or more executions may be selected at random from among all executions for the top consumer, or according to selection criteria (e.g., a top resource consumer from among the executions). In some instances, a single execution is halted, while in other instances the service 160 transmits instructions to halt multiple executions. By halting one or more executions associated with a top resource group, overall resource usage of the system 110 can be decreased, moving the system 110 towards a lower scarcity level. Revocation of resources can further include transmitting an instruction to destroy one or more execution environments of the top resource consumer, which environment may be selected similarly to the one or more executions noted above. Destruction of an environment hosting an execution can be expected to halt that execution, and thus destruction of one or more environments may be used as a mechanism to halt executions of the environment.

Thereafter, the routine 500 proceeds again to block 516, where the top resource consumer is added to the halt list (if not already included). The routine 500 then returns to block 502, as discussed above.

Accordingly, implementation of the routine 500 at the system 110 can enable the system 110 to allocate resources under scarcity conditions, ensuring that resource consumption of the system 110 does not reach a level such that operation of the system 110 is impacted for non-top consumers of system resources. The routine 500 can therefore prevent excessive resource usage by individual consumers, and may further prevent attempts to over utilize the system by an individual resource consumer.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An on-demand code execution system comprising:
   one or more computing devices implementing a pool of execution environments, the pool of execution environments hosting:
      executions of a first set of executable code that utilize a first set of computing resources of the one or more computing devices;
      executions of a second set of executable code that utilize a second set of computing resources of the one or more computing devices; and
   a computing devices configured to implement a placement service that obtains requests to allocate additional resources supporting an execution of the first or second set of executable code and determines whether to allocate the additional resources;
   wherein the computing device configured to implement the placement service is further configured, at each period of a set of periods, to:
      obtain, from the one or more computing devices implementing the pool, resource usage data identifying the first set of computing resources used by the executions of the first set of executable code and the second set of computing resources used by the executions of the second set of executable code;
      if a total resource usage of executions hosted by the pool meets a first threshold usage level:
         identify at least one of the first or second set of executable code as a top resource consumer; and deny requests to allocate additional resources to support executions of the top resource consumer until the total resource usage of executions of the pool does not meet the first threshold usage level; and if the total resource usage of executions of the pool meets a second threshold usage level higher than the first threshold usage level, revoke allocation of at least a portion of the set of computing resources used by the executions of the top resource consumer.

2. The on-demand code execution system of claim 1, wherein the first set of executable code represents a first function on the on-demand code execution system, and wherein the second set of executable code represents a second function.

3. The on-demand code execution system of claim 1, wherein the first set of executable code represents code associated with a first account on the on-demand code execution system, and wherein the second set of executable code represents code associated with a second account.

4. The on-demand code execution system of claim 1, wherein the requests to allocate additional resources to support executions of the top resource consumer represent requests to allocate an additional execution environment to support executions of the top resource consumer.

5. The on-demand code execution system of claim 4, wherein the additional execution environment is at least one of a virtual machine instance or a software container.

6. A computer-implemented method comprising:
obtaining, from one or more computing devices implementing a pool of execution environments of an on-demand code execution system, resource usage data identifying resource usage of executions hosted by the pool, the resource usage data identifying at least a first set of computing resources used by a first group of code executions and a second set of computing resources used by a second group of code executions; and
determining, from at least the resource usage data, that a total resource usage of the executions hosted by the pool meets a first threshold usage level;
identifying at least one of the first or second group of code executions as a top resource consumer;
denying at least one request to allocate additional resources to support the group of code executions identified as the top resource consumer while the total resource usage of the executions hosted by the pool meets the first threshold usage level;
obtaining, from the one or more computing devices implementing the pool of execution environments, updated resource usage data identifying resource usage of executions hosted by the pool; and
determining, from at least the updated resource usage data, that the total resource usage of the executions hosted by the pool does not meet the first threshold usage level; and
while the total resource usage of the executions hosted by the pool does not meet the first threshold usage level, responding to an additional request to allocate additional resources to support the group of code executions identified as the top resource consumer by allocating the additional resources to support executions of the top resource consumer.

7. The computer-implemented method of claim 6 further comprising:
determining, from at least the resource usage data, that the total resource usage of the executions hosted by the pool meets a second threshold usage level higher than the first threshold usage level; and
responsive to determining that the total resource usage of the executions hosted by the pool meets the second threshold usage level, revoking allocation of at least a portion of the set of computing resources used by the group of code executions identified as the top resource consumer.

8. The computer-implemented method of claim 7, wherein revoking allocation of at least a portion of the set of computing resources used by the group of code executions identified as the top resource consumer comprises destroying at least one execution environment in which an execution of the group of code executions is executing.

9. The computer-implemented method of claim 8 further comprising selecting the at least one execution environment at random from a set of execution environments in which the group of code executions identified as the top resource consumer are executing.

10. The computer-implemented method of claim 8 further comprising selecting the at least one execution environment from a set of execution environments in which the group of code executions identified as the top resource consumer are executing based at least partly on resource usage of the execution environment.

11. The computer-implemented method of claim 6, wherein identifying at least one of the first or second group of code executions as the top resource consumer comprises identifying the first group of code executions as the top resource consumer based at least partly on determining that the first set of computing resources exceeds the second set of computing resources used by a second group of code executions.

12. The computer-implemented method of claim 6, wherein identifying at least one of the first or second group of code executions as the top resource consumer comprises identifying the first group of code executions as the top resource consumer based at least partly on determining that the first set of computing resources exceeds an historical computing resource usage metric of the first group of code executions by a larger amount than the second set of computing resources exceeds an historical computing resource usage metric of the second group of code executions.

13. The computer-implemented method of claim 6, wherein the resource usage data reflects usage of at least one of processors of the pool, random access memory (RAM) of the pool, data storage of the pool, or network bandwidth of the pool.

14. Non-transitory computer-readable media comprising instructions that, when executed by a computing system, configure the computing system to:
at each period of a set of periods:
obtain, from one or more computing devices implementing a pool of execution environments of an on-demand code execution system, resource usage data identifying resource usage of executions hosted by the pool, the resource usage data identifying at least a first set of computing resources used by a first group of code executions and a second set of computing resources used by a second group of code executions; and
if a total resource usage of executions hosted by the pool meets a first threshold usage level:
identify at least one of the first or second group of code executions as a top resource consumer; and deny requests to allocate additional resources to support the group of code executions identified as the top resource consumer until the total resource usage of executions of the pool does not meet the first threshold usage level.

15. The non-transitory computer-readable media of claim 14, wherein the instructions further configure the computing system to:
at each period of the set of periods, if the total resource usage of executions of the pool meets a second threshold usage level higher than the first threshold usage level, revoke allocation of at least a portion of the set of computing resources used by the group of code executions identified as the top resource consumer.

16. The non-transitory computer-readable media of claim 14, wherein the instructions further configure the computing system to identify both the first and second group of code executions as the top resource consumer when the first set of computing resources matches the second set of computing resources.

17. The non-transitory computer-readable media of claim 14, wherein the instructions further configure the computing system, when the first set of computing resources matches the second set of computing resources, to randomly select one of first and second group of code executions as the top resource consumer.

18. The non-transitory computer-readable media of claim 14, wherein the instructions further configure the computing system, when the first set of computing resources matches the second set of computing resources, to select one of first and second group of code executions as the top resource consumer based at least in part on a history of resource use of the first group of code executions and a history of resource use of the second group of code executions.

19. The non-transitory computer-readable media of claim 14, wherein the instructions configure the computing system to identify at least one of the first or second group of code executions as the top resource consumer at least partly by determining that the first set of computing resources exceeds the second set of computing resources used by a second group of code executions.

20. The non-transitory computer-readable media of claim 14, wherein the instructions configure the computing system to identify at least one of the first or second group of code executions as the top resource consumer at least partly by determining that the first set of computing resources exceeds an historical computing resource usage metric of the first group of code executions by a larger amount than the second set of computing resources exceeds an historical computing resource usage metric of the second group of code executions.

21. The non-transitory computer-readable media of claim 14, wherein each group of executable code represents at least one of a function on the on-demand code execution system or code associated with an account on the on-demand code execution system.

* * * * *